Nov. 4, 1958 M. P. REHORN 2,858,731
THREE DIMENSIONAL PROJECTOR SYSTEMS
Filed Oct. 21, 1954 3 Sheets-Sheet 1
FIG. 1
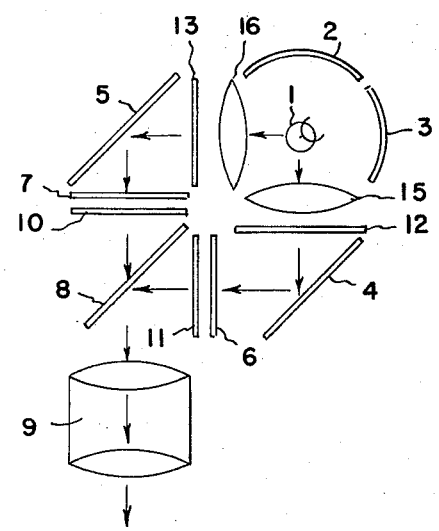
FIG. 2
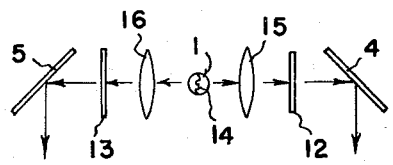
FIG. 3
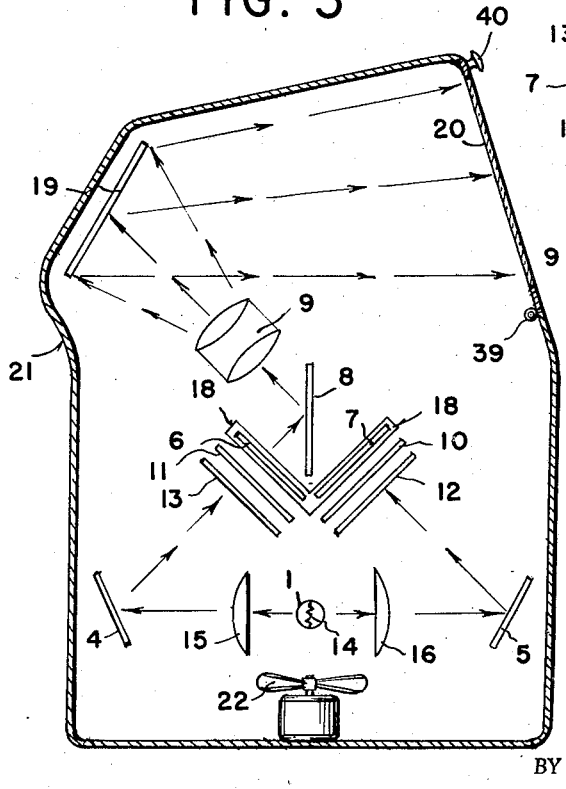
FIG. 2-A
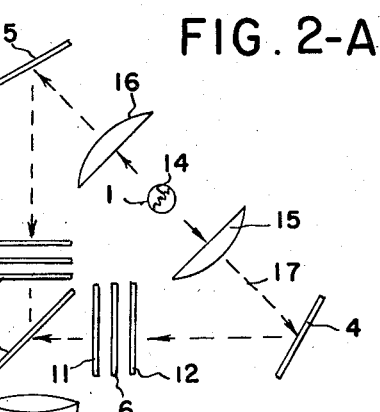
FIG. 4
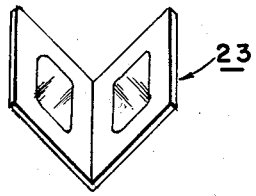
INVENTOR
Miles P. Rehorn
BY
ATTORNEYS

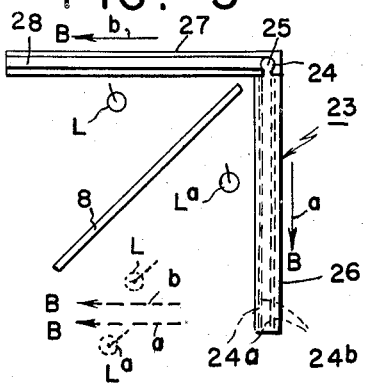

Nov. 4, 1958  M. P. REHORN  2,858,731
THREE DIMENSIONAL PROJECTOR SYSTEMS
Filed Oct. 21, 1954  3 Sheets-Sheet 3

INVENTOR
Miles P. Rehorn
BY
ATTORNEYS

United States Patent Office 2,858,731
Patented Nov. 4, 1958

2,858,731

THREE DIMENSIONAL PROJECTOR SYSTEMS

Miles P. Rehorn, Toledo, Ohio

Application October 21, 1954, Serial No. 463,763

9 Claims. (Cl. 88—26)

My invention pertains to three dimensional projectors and particularly to a unique optical system for use in such projectors.

One object of the invention is to provde an optical system for three dimensional projectors which is more economical than that used in standard stereoscopic projectors in that only a single lens system, except for condensor lenses, is required.

In standard 3-D slide projectors, two extra controls are required other than the focus control; one for tilting and one for lens separation for differing projection distances. Another object of the invention is to eliminate the need for any controls except the focus control.

Another object of the invention is to provide an arrangement of parts of the optical system indicated above such that the light source is so positioned that reflectors for reflecting from the original light source are unnecessary.

Another object of the invention is to provide a slide projector, in which the above indicated optical system may be incorporated, through which stereoscopic slides shaped in the form of two adjacent sides of a square may be fed through the projector in V position with the bottom of the V in the normal lowermost position as in standard printing. The slides may be fed through the said projector without the use of the well known shuttle or slide rack, which is an added economical feature.

Another object of the invention is to provide a hinged V-shaped slide mount, for use in said 3-D projector, which may be separated and reassembled for use in standard 3-D slide viewers.

Still another object of the invention is to provide a projector in which the above indicated optical system may be used wherein a 3-D slide reel containing a plurality of V-shaped slide mounts may be easily inserted, operated, and removed and which requires no elaborate mechanism for turning in the projector for changing from scene position to scene position.

Another object of the invention is to provide a 3-D slide reel of the type above indicated which may be conveniently and compactly packed with other similar reels in a carrying case.

Referring to the figures of the drawing:

Fig. 1 is a plan view of one form the optical system hereinafter disclosed may take;

Fig. 2 shows a unique mirror and light source arrangement which is useful in one form of my invention;

Figure 8:
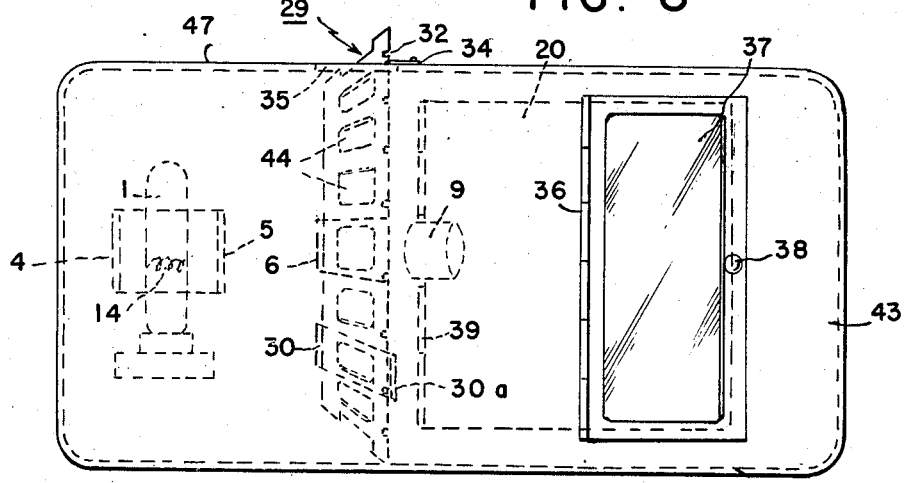
Figure 10:
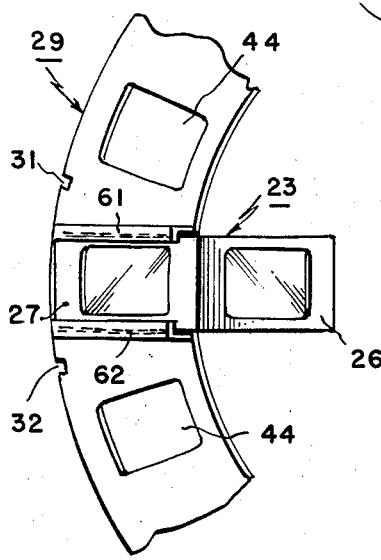
Figure 9:
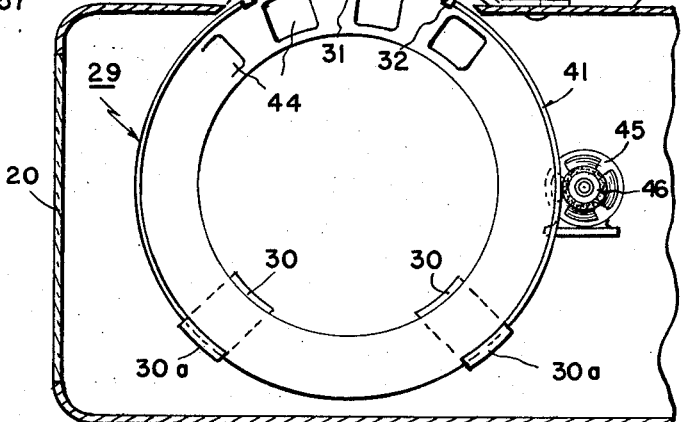

Fig. 2–A is a plan view of another form the optical system of Fig. 1 may take which uses in part the mirror and light source arrangement of Fig. 2;

Fig. 3 is an elevational view of a projector incorporating the optical arrangement of Fig. 2;

Fig. 4 shows a perspective view of a V-type slide mount for use in the said optical system;

Fig. 5 is an enlarged view of the slide mount of Fig. 4 with half mirror 8 also shown in combination therewith;

Fig. 6 shows the two portions of the slide mount of Fig. 5 reassembled for use in a standard 3-D viewer;

Fig. 7 is an elevational view of a projector similar to that of Fig. 3 but which uses circular reels on which may be mounted a plurality of V-type slide mounts such as that shown in Figs. 4 and 5;

Fig. 8 is another view of the projector shown in Fig. 7;

Fig. 9 is a partial view of the projector shown in Figs. 7 and 8 showing details of two different mechanical means for moving the reel in the projector; and Fig. 10 is an enlarged view of a portion of the slide reel shown in the projector of Figs. 7 and 8 showing the slots into which the slide mounts of Figs. 4 and 5 may be fitted.

Referring again to Fig. 1, light rays from the light source 1 pass to the full mirrors 4 and 5 which in turn reflect the rays of light striking them through stereoscopic images 6 and 7 to the semi-transparent element 8 which may be a half mirror such as that shown. The light passing through stereo image 6 is reflected from half mirror 8 through the projection lens 9; likewise light passing through the stereo image 7 is transmitted through mirror 8 and thence through the lens 9. If images 6 and 7 are light polarizing images no further polarization is needed. But if images 6 and 7 are not polarized and a final cross-polarized image is desired, then polarizing filters 10 and 11 may be used for polarizing the light passing through the stereo images 6 and 7 respectively. These may be plane polarizing filters or interlinear polarizers depending upon the stereoscopic viewing system used. Such interlinear polarizers as here referred to are disclosed in my Patent No. 2,647,448. Heat filters 12 and 13 may be used to protect the film from excessive heat from light source 1. Condenser lenses indicated at 15 and 16 may be used if desired for making the rays of light from source 1 parallel.

The arrangement of the parts of the optical system of Fig. 1 is as shown. Light passes from source 1 aided by reflectors 2 and 3 in directions which are at right angles to each other until they reach mirrors 4 and 5 where a right angled reflection takes place at each said mirror. The separate light paths then are directed so as to meet at half mirror 8 where they are reflected and transmitted respectively through lens 9 in a single direction.

This projector lens system, also that subsequently disclosed, and shown in Figs. 2–A, 3 and 7, may be applied to any type of three dimensional projector, that is, it may be adapted to 3-D motion picture or still projectors for either rear or forward projection. It may be also used in the projectors of Figs. 3 and 7 in lieu of the optical arrangement shown there which will now be disclosed.

Fig. 2 shows an arrangement of mirrors 4 and 5, light source 1 and indicated condensor system 15 and 16 wherein the filament of light source 1 may be positioned perpendicular to the paths of light passing to the mirrors 4 and 5. This mirror and light source arrangement was previously disclosed in my Patent No. 2,669,901, February 23, 1954.

Fig. 2–A shows a preferred modification of the optical system herein disclosed which utilizes in part the arrangement of Fig. 2. The advantage of this modification is that the filament 14 of the light source 1 may be positioned as shown so that light passing therefrom to images 6 and 7 respectively reaches said images in more uniform intensity than in the arrangement of Fig. 1. The paths of the light rays passing from source 1 in the two directions shown, to full mirrors 4 and 5 thence through images 6 and 7 to be reflected and transmitted by half mirror 8 through lens 9 form a triangle as shown. The angle formed by dotted line 17 in the area of the images 6 and 7 and half mirror 8 is of course a right angle while each of the angles formed by the light paths when reflected at mirrors 4 and 5 is a 45° angle. Condenser systems 15 and 16 are positioned near the light source 1 and heat filters 12 and 13 are shown near the images 6 and 7 respectively. A second set of condensor lenses (not shown) may be placed next to those shown (15 and 16), or may be placed respectively between the mirrors 4 and 5 and images 6 and 7.

Fig. 3 shows a projector containing the optical system having the arrangement of parts indicated in Fig. 2–A. It should be noted that the light rays passing from source 1 to mirrors 4 and 5 respectively are in line and proceed in horizontal directions. The projector is shown in normal upright position for projection; also image slides 6 and 7 form a V in V-shaped slide slot 18 which may pass from side to side of the projector 21. V type slide mounts such as that indicated in Fig. 4 which contain, for example, 35 mm. slides, may be fed from either side of the projector through the slot 18. Mirror 19 reflects the polarized images passing through lens 9 onto nondepolarizing translux screen 20. Translux screen 20 may be removable or movable, the screen being framed in a door which swings on hinge 39 and is opened by means of handle 40. The movable feature of this screen makes it possible for projector 21 to be used for large screen projection. This may be either from the rear onto a large translux screen or forward onto a metallic type screen. The V type slides will be oppositely oriented (that is reversed in the projector) for forward projection from the orientation required for rear projection. A fan 22 may be used for cooling.

Figs. 5 and 6 show a convenient form the slide mounts used in the projector system herein disclosed may take in order that they may be quickly taken apart from their V formation and re-assembled in a straight line for viewing in standard 3–D viewers.

In Fig. 5, a V type slide 23 is shown with image orientation as indicated by solid arrows $a$ and $b$ (B indicates bottom of image, and arrows L and $L^a$ pointing downward indicate left side of the images). Half mirror 8 causes the orientation of the images (just before they pass through lens 9, Fig. 3) indicated by dotted arrows $a$ and $b$ and dotted arrows L and $L^a$. It is desired on occasions to take the slide mount quickly apart. This is done by means of a slot 24, at one end and on the side of that part 27 of slide mount 23, into which a pin 25 (which forms the end of that part 26 of slide mount 23) slides. Pin 25 is slipped out of the slot 24. Then pin 28 which is similar to pin 25 and runs along the top edge of part 27, Fig. 5, is inserted into slot $24^b$ (as shown in Fig. 6), which slot is in the bottom edge of part 26, Fig. 5. Thus the two slide halves are now properly oriented for standard 3–D viewers, assuming that the part 27 contains a left eye image and the part 26 a right eye image. (Since arrows $a$ and $b$ indicating the bottom of the images are pointing upward in Fig. 6, the reassembled mount must be turned over for viewing.) Similarly by inserting pin 28 into slot $24^a$, Fig. 6 ($24^a$ is shown dotted and runs along the left side near the top of part 26 in Fig. 5) the slide mount again forms a right angled assembly for projection in the projector of Fig. 7. The reason the mount 23 must be assembled differently for the projector of Fig. 7, from the assembly for Fig. 3, is that the optical system of Fig. 2–A is positioned differently in these projectors. Match markings of different colors on the slide mount can simplify this disassembly and reassembly.

In Fig. 7, a modified form of the projector of Fig. 3 is shown, in which the arrangement of parts of Fig. 2–A assumes a different position in the projector; as has been briefly already pointed out. Here the triangle formed by the line of the paths of light from the source 1 is in a plane parallel with that of the bottom of the projector as shown. Mirror 8 is movable to dotted line position 8 as shown and polarizing filter 11 is movable to dotted line position 11 in order that slide reel 29 for containing a plurality of V type slides 23 (Figs. 4 and 5) may be easily slipped into place in the projector 43. Any well known means may be used for moving mirror 8 and filter 11 to the dotted line positions and back again after insertion of reel 29; for example, slots may be provided in which they are held firmly but which allow them to slide by manual control by means of a rod extending from them through slots in the top of the projector. The reel 29 is shaped like that surface of a cone developed when the cone is intersected by a plane passed parallel to the base of the cone and rests in a pair of partially circular and angled tracks 30, only one of which is shown in Fig. 8, but both are shown in Fig. 9. (Or a pair of rollers with flanged ends may be used instead of tracks, but since the reel is light in weight, tracks are satisfactory.) The reel 29 resting on the beveled tracks 30, with flanged edges $30^a$ may be turned easily by means of a coin or other suitable means by insertion into slots such as 31 and 32, Fig. 7. These slots are uniformly spaced around the reel 29. For example a coin may be inserted in slot 31 and moved to the position of slot 32. This distance of movement for each change of scene is always such that each scene is exactly left in its proper position for projection when the coin will move reel 29 no further. Error from momentum gathered by reel 29 may be eliminated by stop 34 (Figs. 7 and 8) which may be merely a thin rectangular block protruding beyond the opening 35, Fig. 7, in the projector top 47 (not shown in Fig. 7) for receiving the reel 29. The block or stop 34 rests upon (or may be of one piece with) the top 47 of projector 43, permits the coin and hence the reel to move no further. In Figs. 7 and 8 it will be observed that the beveled shape of the circular reel 29 is such, that even when containing slides 23 (see Fig. 10) other reels may be superimposed with it for close compact storage in a carrying case.

Another way the reel 29 may be moved from scene to scene is by means of a motor 45 (see Fig. 9) which drives a rubber wheel 46. The rubber wheel 46 touches the edge 41 of the reel 29 for traction and the motor 45 will be timed by an automatic switch for on and off operation in the well known manner, for changing the scenes. Or the motor may drive a set of gears, geared down and timed to operate a cam at intervals for simulating the coin action. The motor arrangement would be particularly advantageous for advertising displays.

Another very convenient method of moving the slide reels from scene to scene is shown in Fig. 9 (which is a partial side view of the projector of Figs. 7 and 8). A substantial guard 42 comprising in part a half tube is secured to the top 47 of the projector 43 by means of a bolt 48 and wing nut 49.

A stiff but flexible rod 50 is held against the guard 42 by means of the clasping action of tube 51 which is firmly joined to the guard 42 at 52. The protrusion 53 on end of rod 50 fits into slot 31 of reel 29. Fingers of the operator are held beneath flanges 54 and 55 and his thumb presses button 56 until it is depressed to the position next to flanges 54 and 55. Flanges 54 and 55 are joined to the top of tube 51 through which rod 50 passes. When button 56 is moved to position 57 protrusion 53 moves reel 29 by means of slot 31 to position of slot 32. When pressure of thumb is released on button 56, it returns to its original position by means of the action of spring 58. Also the entire rod 50 moves, returning the protrusion 53 to its original position of slot 31 ready for another slide change movement. Rod 50 should be flexible enough and loose enough to drop the protrusion 53 by gravity into slot 31 and to easily be removed from said slot after movement is completed. Arrows 59 and 60 indicate the travel distances of button 56 and of protrusion 53.

The reel 29, Figs. 7 and 8, may be easily inserted into position through a large opening 35 in the top 47 (not shown in Fig. 7) of the projector 43. The opening 35 is shaped to the diameter and thickness of the reel 29.

Translucent screen 20, Fig. 7, is movable by means of hinge 39 and handle 40, for large screen rear projection and mirror 19, Fig. 7, is removable through hinged door 37 (hinged at 36) for forward projection by means of knob or handle 38.

Fig. 10 shows an enlarged cut away or partial view of the slide reel 29. The slide mount 23 is shown held in place on reel 29 by means of a pair of slots 61 and 62 adjacent the inside surface of the reel 29. The reel 29 of course has openings 44 accurately spaced to correspond to the slide images for permitting light to pass therethrough when in position for projection through lens 9, Fig. 7.

Any suitable material may be used for making the various parts herein disclosed. It is suggested, however, that the reel 29 and slide mount 23 be made of Duralumin or aluminum.

Having disclosed my invention which comprises a projector system which includes a unique slide mount, slide mount reel, optical system and projector design,

I claim:

1. In a stereoscopic projection system, the said system including a projector for projecting a pair of stereoscopic images, the said projector comprising image slots for receiving said images while said images are in position for projection, said slots being at right angles to each other, means for positioning said images in said image slots, a portion of said means being an angular slide mount on which the said images are held at right angles to each other, an optical system, the said optical system comprising a single light source for directing light beams in two directions to a pair of reflecting mirrors respectively, one of the said mirrors being positioned so as to direct by reflection the beam of light directed to said mirror through one of the said image slots, the other of said mirrors being positioned so as to direct by reflection the beam of light directed thereto through the other of the said image slots, a polarizing means for polarizing each of the said beams of light and a partly reflecting partly transmitting device positioned within the right angle formed by the said image slots for directing light passing through said slots into a common path thence through a single projection lens.

2. The slide mount according to claim 1, the said slide mount being in two sections, the said sections having end joining means for assembling said sections together at right angles to each other for projection and for reassembling said sections for viewing in a conventional three dimensional viewer.

3. The system set forth in claim 1, a portion of the said means for positioning the said images in the said image slots being a reel, the said reel comprising a surface on which stereoscopic slides of one eye aspect are uniformly mounted and means for uniformly positioning stereoscopic slides of the corresponding other eye aspect at right angles respectively to the first said slides.

4. A reel according to claim 3, at least one surface of the said reel being in the form of a lateral section of a hollow cone, said lateral section being developed by passing a plane transversely of and parallel to the base of the cone.

5. In combination, the system of claim 3, and a guiding means within the said projector, the said guiding means being for holding the said reel in place and for guiding the said reel through the said projector for positioning the right and left eye image aspect pairs in the projector for projection.

6. The combination of claim 5, and a plurality of uniformly positioned slots in said reel for insertion of a device, the said device being for exerting pressure upon said reel for the purpose of moving said reel from scene to scene in said projector.

7. A system according to claim 1, the said projector comprising an additional reflecting mirror and a non-depolarizing screen, the said additional reflecting mirror being positioned so as to reflect the polarized image carrying light beams passing from the said projection lens, and to reflect them to the said non-depolarizing screen, the said additional mirror being movable, and a door behind the said additional mirror through which, when opened, after said mirror is moved, the said projected beams may pass to a large non-depolarizing screen spaced from the said projector.

8. A system according to claim 1, the said projector comprising an additional reflecting mirror and a non-depolarizing screen, the said additional reflecting mirror being positioned so as to reflect the polarized image carrying light beams passing from the said projection lens, and to reflect them to the said non-depolarizing screen, the said non-depolarizing screen being movable in order that the said projected beams may pass to a large non-depolarizing screen spaced from the projector.

9. The system according to claim 1, at least a portion of the said means for positioning the said images in the said image slots being a pair of slots positioned at right angles to each other, through which the said images are moved into position for projection.

References Cited in the file of this patent

UNITED STATES PATENTS

| | | |
|---|---|---|
| 1,238,775 | Ives | Sept. 4, 1917 |
| 1,992,872 | Mahler | Feb. 26, 1935 |
| 2,084,350 | Land | June 22, 1937 |
| 2,132,670 | Young | Oct. 11, 1938 |
| 2,525,598 | Gruber | Oct. 10, 1950 |
| 2,571,584 | Kurz | Oct. 16, 1951 |
| 2,669,901 | Rehorn | Feb. 23, 1954 |